July 10, 1923.
A. E. FALOR
1,461,385
FLUID CONDUIT COUPLING DEVICE
Filed April 1, 1920
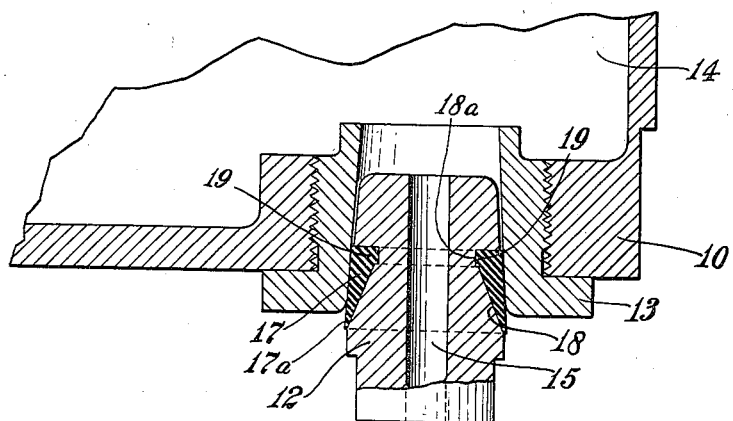
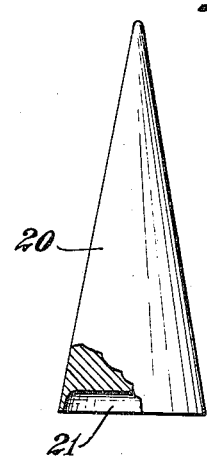
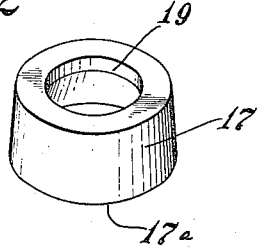
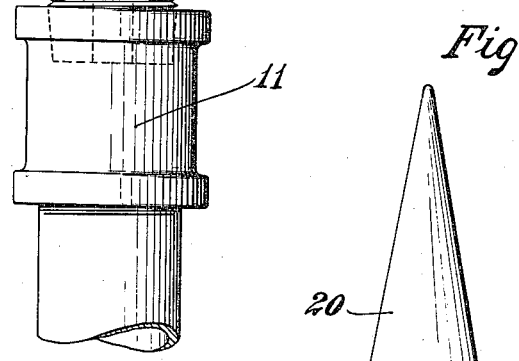
Inventor
Abram E. Falor
By Robert M. Pierson
Atty.

Patented July 10, 1923.  1,461,385

UNITED STATES PATENT OFFICE.

ABRAM E. FALOR, OF AKRON, OHIO, ASSIGNOR TO THE B. F. GOODRICH COMPANY, OF NEW YORK, N. Y., A CORPORATION OF NEW YORK.

FLUID-CONDUIT COUPLING DEVICE.

Application filed April 1, 1920. Serial No. 370,547.

*To all whom it may concern:*

Be it known that I, ABRAM E. FALOR, a citizen of the United States, residing at Akron, in the county of Summit and State of Ohio, have invented a certain new and useful Fluid-Conduit Coupling Device, of which the following is a specification.

This invention relates to couplings for use in fluid-pressure systems, such, for example, as the differential-pressure apparatus employed in vulcanizing rubber boots, wherein the boot is built on a perforated hollow last or tree which is then placed in an inverted position on a rack of piping mounted on a car which is run into a steam vulcanizing chamber, the lasts having short tapered sockets or coupling members in their heads which are fitted over complemental coupling members or last-supporting plugs on the racks, whereby the lasts are vented to the outside of the vulcanizer through the plugs, the rack piping and suitable detachable hose and pipe connections from the car.

The plug members of these couplings are provided with frusto-conical rubber gasket rings, which are difficult to keep reasonably pressure-tight and in good order under the rough conditions of use, and which in many cases can be renewed only at considerable trouble and cost. It is the object of my invention to provide a coupling for the foregoing and analogous situations, having a gasket structure which will afford a better seal, through a longer period of use than heretofore, and which when worn out may be renewed quickly and at a small expense.

Of the accompanying drawings:

Fig. 1 is an elevation, partly in section, showing a preferred embodiment of my invention.

Fig. 2 is a perspective view of the sealing member alone.

Fig. 3 is an elevation of a conical spreader or guide which may be used in placing the sealing member in position on the plug.

Referring to Fig. 1, 10 is the lower portion of an inverted boot tree or last, 11 is a last-supporting pipe, 12 is a tapered metal plug or male coupling member, and 13 is a complemental, female coupling member or socket screwed into the head of the last and conically formed internally to fit the exterior of the plug 12. 14 is a chamber within the last 10, communicating through the duct or bore 15 of the plug 12 with the pipe 11. 17 is a sealing member or gasket of vulcanized soft rubber having the general form of an annular wedge terminating in a thin lip 17a at its lower end and formed at its upper end with an internal flange 19.

The metal plug in its general outline is frusto-conical, with an upward taper, and is formed with an annular recess 18 in its outer periphery, the walls of which form a seat for the sealing member 17. This recess is deepest at the top, where it is provided with a groove 18a adapted to receive the internal flange 19 of the sealing member 17, and is of decreasing depth downward to correspond to the tapering wall of said sealing member.

Preferably, the gasket or sealing member 17 is separately molded and vulcanized and is then placed in position in the recess 18 of the plug. It is normally slightly smaller than its seat, so that when in place upon the plug it will be somewhat stretched, causing it to fit tightly against the plug. It is of such thickness that, when seated, its outer surface is nearly flush with the conical metal surfaces of the plug, but projects radially slightly beyond the latter.

The tapering form of the wall of said gasket permits it to be readily slipped into place over the nose of the plug, especially when the conical spreader or guide 20 shown in Fig. 3 is used. This spreaker is formed with a hollow base 21 adapted to fit the top of the plug 12. In applying a gasket, the spreader is set on top of the plug and the gasket is readily forced down over its sloping sides onto the plug. When an old gasket is worn out, it requires but a few seconds to tear it off and replace it with a new one, without detaching the plug from its support.

When the gasket has been seated in its recess on the plug, the latter is ready to receive the boot tree or last, which is set on the plug as shown in Fig. 1. The inner surface of the coupling member 13 and the outer surface of the metal plug 12 and gasket 17 are so fitted that the weight of the last is largely supported by the sloping walls of the metal plug, while the gasket itself is only sufficiently compressed to afford a tight seal. Fig. 1 shows the gasket uncompressed, before the member 13 is fully seated. The tapering form of the gasket lip and its seat permits the lower portion of the gasket to be crowded down over the external surface of the plug by the drag of the coupling member 13 on the material of the gasket, thus increasing the fluid-tightness of the joint, while the flange 19 on the gasket keeps the body of said gasket properly in place on the plug.

I claim:

1. A fluid-conduit coupling member provided with a through fluid passage and having an externally conical portion adapted to interfit with a complemental coupling member, said portion being formed with an annular gasket-holding recess relatively shallow at its margin of greater circumference and relatively deeper at a portion of smaller circumference, and an annular soft gasket of tapered section occupying said recess.

2. An externally-conical coupling plug provided with a through fluid passage and formed externally with an annular gasket-holding recess tapering to a shallow margin at a relatively-wide part of the plug and deeper at a relatively-narrower part of said plug, and an annular, soft-rubber gasket removably occupying said recess and elastically embracing the plug.

3. In a fluid-conduit coupling device, the combination of a perforate, tapered, metal plug formed with an annular gasket-holding recess in its outer periphery, said recess being deepest at its margin nearest the nose of the plug and of decreasing depth toward its opposite margin, an annular, soft-rubber gasket removably occupying said recess and elastically embracing the plug, and a female coupling member complemental to said plug.

4. In a fluid-conduit coupling device, the combination of a perforate, conical, plug formed with an annular gasket-holding recess relatively deep at its margin nearest the nose of the plug and relatively shallow at the opposite margin, and having a groove at its deepest portion, and an annular soft gasket of tapered section occupying said recess and formed with an internal flange seated in said groove.

In witness whereof I have hereunto set my hand this 25th day of March, 1920.

ABRAM E. FALOR.